United States Patent
Binder et al.

(10) Patent No.: US 11,773,300 B2
(45) Date of Patent: Oct. 3, 2023

(54) ACRYLIC ADHESIVE COMPOSITIONS AND METHODS OF MAKING SAME

(71) Applicants: Dow Global Technologies LLC, Midland, MI (US); Rohm and Haas Company, Collegeville, PA (US)

(72) Inventors: Joseph B. Binder, Haverford, PA (US); Hany Necola, Valbonne (FR)

(73) Assignees: Dow Global Technologies LLC, Midland, MI (US); Rohm and Hass Company, Collegeville, PA (US)

( * ) Notice: Subject to any disclaimer, the term of this patent is extended or adjusted under 35 U.S.C. 154(b) by 392 days.

(21) Appl. No.: 16/643,257

(22) PCT Filed: Jul. 17, 2018

(86) PCT No.: PCT/US2018/042433
§ 371 (c)(1),
(2) Date: Feb. 28, 2020

(87) PCT Pub. No.: WO2019/067070
PCT Pub. Date: Apr. 4, 2019

(65) Prior Publication Data
US 2020/0255700 A1    Aug. 13, 2020

Related U.S. Application Data

(60) Provisional application No. 62/563,670, filed on Sep. 27, 2017.

(51) Int. Cl.
| | |
|---|---|
| *C09J 133/04* | (2006.01) |
| *C09J 7/38* | (2018.01) |
| *C08F 220/18* | (2006.01) |
| *C08F 2/22* | (2006.01) |
| *C08F 212/08* | (2006.01) |
| *C08F 220/14* | (2006.01) |

(52) U.S. Cl.
CPC .............. *C09J 133/04* (2013.01); *C08F 2/22* (2013.01); *C08F 212/08* (2013.01); *C08F 220/14* (2013.01); *C08F 220/1802* (2020.02); *C09J 7/385* (2018.01); *C08F 220/1808* (2020.02); *C09J 2203/334* (2013.01)

(58) Field of Classification Search
CPC .......... C08F 220/1808; C08F 220/1802; C08F 220/14; C08F 220/06
See application file for complete search history.

(56) References Cited

U.S. PATENT DOCUMENTS

| | | | |
|---|---|---|---|
| 4,371,659 A | 2/1983 | Druschke et al. | |
| 5,164,444 A | 11/1992 | Bernard | |
| 6,225,401 B1 | 5/2001 | Rehmer et al. | |
| 9,273,236 B2 | 3/2016 | Gerst et al. | |
| 9,518,199 B2 | 12/2016 | Gerst et al. | |
| 9,976,060 B2 | 5/2018 | Dimmer et al. | |
| 2006/0024263 A1* | 2/2006 | Van Es | C09D 133/08 |
| | | | 525/329.7 |
| 2010/0003442 A1 | 1/2010 | Even et al. | |
| 2011/0033701 A1 | 2/2011 | Gerst et al. | |
| 2014/0142238 A1* | 5/2014 | Guo | C09J 133/14 |
| | | | 524/521 |
| 2017/0198169 A1 | 7/2017 | Dimmer | |
| 2020/0255700 A1* | 8/2020 | Binder | C08F 212/08 |

FOREIGN PATENT DOCUMENTS

| | | | | |
|---|---|---|---|---|
| EP | 1426428 | | 6/2004 | |
| JP | 06287890 | | 10/1994 | |
| WO | 2008003758 | | 1/2008 | |
| WO | 2011037732 | | 3/2011 | |
| WO | WO-2016000938 A1 * | 1/2016 | ............ C08F 220/14 |

OTHER PUBLICATIONS

Czech, Zbigneiw. "Synthesis of Removable and Repositionable Water-Borne Pressure-Sensitive Adhesive Acrylics" Journal of Applied Polymer Science (2005), 97(3), 886-892.
PCT/US2018/042433, International Search Report and Written Opinion dated Nov. 9, 2018.
PCT/US2018/042433, International Preliminary Report on Patentability dated Mar. 31, 2020.

* cited by examiner

*Primary Examiner* — Mark S Kaucher
(74) *Attorney, Agent, or Firm* — Boyle Fredrickson, S.C.

(57) ABSTRACT

Adhesive compositions are disclosed comprising acrylic copolymers formed from a monomer mixture comprising, based on the total weight of monomers in the monomer mixture, from 59 to 97.9 weight percent 2-ethylhexyl acrylate, from 0.1 to 10 weight percent styrene, from 0 to 25 weight percent methyl methacrylate, and from 2 to 30 weight percent ethyl acrylate, wherein the ratio of ethyl acrylate to styrene (by weight) is greater than 4.5 to 1. Methods for preparing adhesive compositions are disclosed comprising feeding an aqueous initial charge to a reactor, heating the aqueous initial charge to from about 30 to 110° C., gradually feeding a monomer mixture into the reactor over a period of time (less than 3 hours), in the presence of a free-radical polymerization initiator, thereby forming the acrylic adhesive composition, wherein the amount of free monomer in the reactor does not exceed 17 percent by weight, based on the total weight of the reactor contents, during gradual feeding.

7 Claims, No Drawings

US 11,773,300 B2

ACRYLIC ADHESIVE COMPOSITIONS AND METHODS OF MAKING SAME

REFERENCE TO RELATED APPLICATIONS

The present application claims the benefit of U.S. Provisional Application No. 62/563,670, filed on Sep. 27, 2017.

FIELD OF THE DISCLOSURE

The instant disclosure relates to adhesive compositions. In some embodiments, the disclosure relates to adhesive compositions for use in, for example, pressure sensitive adhesive formulations used in label applications, including in food contact applications, the compositions having suitable properties for pressure sensitive adhesive applications and capable of being prepared relatively more efficiently compared with existing pressure sensitive adhesive compositions. The disclosure further relates to methods of making adhesive compositions. The disclosure still further relates to food contact articles including the disclosed adhesive compositions.

BACKGROUND AND SUMMARY OF THE DISCLOSURE

Adhesive compositions are useful for a wide variety of purposes. One particularly useful subset of adhesive compositions is pressure sensitive adhesives. The use of pressure sensitive adhesives in different end-use applications is generally known. For instance, pressure sensitive adhesives can be used with labels, tapes, notepads, decals, bandages, decorative and protective sheets, and a wide variety of other products. As used in the art, the term "pressure sensitive adhesive" designates a material comprising one or more polymer compositions which, when dried, is aggressively and permanently tacky at room temperature. A typical pressure sensitive adhesive will firmly adhere to a variety of dissimilar surfaces upon mere contact without the need of more than finger or hand-applied pressure.

Pressure sensitive adhesives may be prepared by polymerization of a wide variety of monomers, including esters of acrylic acid, esters of methacrylic acid, styrene, vinyl acetate, and acrylonitrile. To act as pressure sensitive adhesives, the monomers should be selected to form copolymers with glass transition temperatures lower than 0° C. Accordingly, monomers having relatively-low glass transition temperatures (lower than 0° C.), such as butyl acrylate and 2-ethylhexyl acrylate, are commonly used as the predominant monomers in these copolymers. Non-acrylic monomers having relatively-higher glass transition temperatures (greater than 20° C.) such as styrene, methyl methacrylate, acrylonitrile, and vinyl acetate are commonly used in only small proportions in forming the copolymers. Despite the small proportions in which they are incorporated, these relatively-higher glass transition temperature monomers contribute important properties to pressure sensitive adhesives, particularly for pressure sensitive adhesives produced by the process of emulsion polymerization.

For instance, U.S. Pat. No. 4,371,659 describes a process in which combinations of monomers such as styrene, methyl methacrylate, acrylonitrile, and vinyl acetate are incorporated into a copolymerization with 2-ethylhexyl acrylate (Example 1) and with butyl acrylate (Example 2) in order to produce aqueous polymer dispersions at high concentrations. U.S. Pat. No. 6,225,401 describes highly-concentrated adhesive dispersions produced by copolymerization of 2-ethylhexyl acrylate with styrene, methyl methacrylate, and optionally vinyl acetate. U.S. Pat. No. 9,518,199 describes pressure sensitive adhesives which are copolymers of butyl acrylate and 2-ethylhexyl acrylate with vinyl acetate and styrene to give enhanced surface tack. U.S. Pat. No. 9,273,236 includes examples which describe pressure sensitive adhesives which are copolymers of 2-ethylhexyl acrylate with styrene and methyl methacrylate for good balances of adhesive and cohesive properties.

However, the inclusion of non-acrylic monomers such as styrene and methyl methacrylate in polymerization with acrylic monomers such as 2-ethylhexyl acrylate and butyl acrylate tends to retard the polymerization of the acrylic monomers and leads to undesirably-long polymerization reaction times to reach high conversion. For instance, U.S. Pat. No. 4,371,659 (Examples 1 to 8) employs a polymerization time of 5 hours. Likewise, U.S. Pat. No. 6,225,401 (Examples 1 to 6) employs a polymerization monomer feed time of 4 hours followed by an initiator feed time of 1 hour for a total conversion time of 5 hours. Further, U.S. Pat. No. 9,273,236 example feed times range from 3.5 to 4 hours. Long feed times are disadvantageous for the production of these adhesive compositions because they require longer reactor cycle times and increase product costs.

Therefore, adhesive compositions suitable for use in pressure sensitive adhesive applications and prepared according to more efficient methods are desirable.

Adhesive compositions suitable for use in, e.g., pressure sensitive adhesive applications, and prepared according to more efficient methods are disclosed herein. In some embodiments, the disclosed adhesive compositions include an acrylic copolymer formed from a monomer mixture. In some embodiments, the monomer mixture includes, based on the total weight of monomers in the monomer mixture, from 59 to 97.9 weight percent 2-ethylhexyl acrylate, from 0.1 to 10 weight percent styrene, from 0 to 25 weight percent methyl methacrylate, and from 2 to 30 weight percent ethyl acrylate, wherein the ratio of ethyl acrylate to styrene (by weight) is greater than 4.5 to 1. In some embodiments, the disclosed adhesive compositions can be prepared with monomer mixture feed times of less than 3 hours.

Methods for preparing adhesive compositions are also disclosed. In some embodiments, the methods comprise preparing a monomer emulsion by feeding an aqueous initial charge to a reactor, heating the aqueous initial charge to from about 30 to 110° C., gradually feeding a monomer mixture into the reactor over a period of time (less than 3 hours), in the presence of a free-radical polymerization initiator, thereby forming the acrylic adhesive composition, the monomer mixture comprising, based on the total weight of monomers in the monomer mixture, from 59 to 97.9 weight percent 2-ethylhexyl acrylate, from 0.1 to 10 weight percent styrene, from 0 to 25 weight percent methyl methacrylate, and from 2 to 30 weight percent ethyl acrylate, wherein the amount of free monomer in the reactor does not exceed 17 percent by weight, based on the total weight of the reactor contents, during gradual feeding.

Food contact articles comprising the disclosed adhesive compositions are also disclosed. In some embodiments, the disclosed food contact article is a plastic packaging, label or tape.

DETAILED DESCRIPTION OF THE DISCLOSURE

The instant disclosure relates to adhesive compositions suitable for use in, e.g., pressure sensitive adhesive applications, and prepared according to more efficient methods. In some embodiments, the disclosed adhesive compositions include an acrylic copolymer dispersed in an aqueous medium and formed from a monomer mixture. In some embodiments, the acrylic copolymer is formed via radical polymerization, e.g., emulsion polymerization. The end result is an acrylic emulsion including a dispersion of acrylic copolymer particles in the aqueous medium, the polymer particles comprising constituent units each being derived from a particular monomer in the monomer mixture. As used herein, "copolymer" refers to a polymer in which two or more different types of monomers are joined in the same polymer chain.

In some embodiments, preparation of the adhesive compositions by emulsion polymerization takes place by initially charging an aqueous phase to a polymerization reactor and then feeding in the monomer mixture to be polymerized. The aqueous initial charge typically includes, in addition to water, a salt.

A surfactant can be introduced to the reactor at any suitable point during the emulsion polymerization process (e.g., with the initial aqueous charge, with the monomer mixture feeding, etc.). In some embodiments, examples of suitable surfactants for use according this disclosure include, but are not limited to, cationic surfactants, anionic surfactants, zwitterionic surfactants, non-ionic surfactants, and combinations thereof. In embodiments where the disclosed adhesive compositions are to be used in food contact applications, suitable surfactants should not contain alkylphenol ethoxylate moieties. The alkylphenol ethoxylate moiety has the chemical structure:

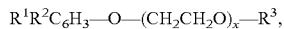

where $R^1$ is H or $C_nH_{(2n+1)}$ where n has an average value that ranges from about 8 to about 12; where $R^2$ is H or $C_nH_{(2n+1)}$ where n has an average value that ranges from about 8 to about 12; where $C_6H_3$ is a substituted benzene ring and x has an average value that ranges from about 1 to about 70; where $R^3$ is H or another substituent such as $SO_3—$. Here, x denotes the average number of moles of ethylene oxide added to the alkylphenol. Examples of cationic surfactants include, but are not limited to, quaternary amines, lauryl-pyridinium chlorides, cetyldimethyl amine acetate, and alkyldimethylbenzylammonium chlorides in which the alkyl group has from 8 to 18 carbon atoms. Examples of anionic surfactants include, but are not limited to, sulfonates, carboxylates, and phosphates. Examples of non-ionic surfactants include, but are not limited to, block copolymers containing ethylene oxide and silicone surfactants, such as ethoxylated linear or branched aliphatic alcohols, ethoxylated fatty acid, sorbitan derivative, lanolin derivative, or alkoxylated polysiloxane.

Anionic, non-ionic, or cationic surfactants which contain alkylphenol ethoxylate moieties, such as ethoxylates of nonylphenol or ethoxylates of octylphenol, are not preferred for food contact applications because they are not included in the Union list of authorized monomers, other starting substances, macromolecules obtained from microbial fermentation, additives and polymer production aids, Annex 1 of EU Commission Regulation 10/2011 governing food contact materials. In addition, surfactants which do not contain alkylphenol ethoxylate moieties tend to be more biodegradable and more likely to comply with environmental regulations, so surfactants containing alkylphenol ethoxylate moieties are not preferred in the disclosed adhesive compositions. Examples of alkylphenol ethoxylate surfactants include, but are not limited to, the sodium salt of the sulfuric ester of isooctylphenol ethoxylated with 1 to 50 ethylene oxide units, the sodium salt of the sulfuric ester of nonylphenol ethoxylated with 1 to 50 ethylene oxide units, and octylphenol ethoxylated with 1 to 50 ethylene oxide units. In some embodiments, the amount of surfactant used is from 0.2 to 5 weight percent, based on the total weight of the monomers in the monomer mixture.

Before beginning the feed of the monomer mixture, the aqueous initial charge is heated to a temperature in the range of from 30 to 110° C. Once the desired temperature is reached, the monomer mixture is gradually fed to the polymerization reactor over a period of time in the presence of a free-radical polymerization initiator. In some embodiments, the maximum amount of free monomer (i.e., the in-process monomer) in the reactor does not exceed 17 percent by weight, or 14 percent by weight, or 10 percent by weight, based on the total weight of the reactor contents, during gradual feeding of the monomer mixture. The in-process monomer content can be determined by headspace gas chromatography of in-process samples. The samples are taken periodically from the reactor while the monomer mixture is being fed to the reactor. Polymerization in the samples is inhibited and the samples are cooled prior to being analyzed by headspace gas chromatography. In some embodiments, the disclosed adhesive compositions can be prepared with monomer mixture feed times of less than 3 hours, or less than 2.5 hours, or less than 2 hours.

In some embodiments, the initiator can be either a thermal initiator or a redox system initiator. Example of thermal initiators include, but are not limited to, sodium persulfate and ammonium persulfate. Where the initiator is a redox system initiator, the reducing agent can be, for example, an ascorbic acid, a sulfoxylate, or an erythorbic acid, while the oxidating agent can be, for example, a peroxide or a persulfate.

In some embodiments, a chain transfer agent may optionally be used. Examples of chain transfer agents which may be used include long chain alkyl mercaptans such as t-dodecyl mercaptans, methyl 3-mercaptopropionate, alcohols such as isopropanol, isobutanol, lauryl alcohol or t-octyl alcohol, carbon tetrachloride, tetrachloroethylene and trichloro-bromoethane.

In some embodiments, the monomer mixture includes, based on the total weight of monomers in the monomer mixture, from 59 to 97.9 weight percent 2-ethylhexyl acrylate, or from 60 to 85 weight percent 2-ethylhexyl acrylate, or from 65 to 80 weight percent 2-ethylhexyl acrylate. In some embodiments, the monomer mixture includes, based on the total weight of monomers in the monomer mixture, from 0.1 to 10 weight percent styrene, or from 0.1 to 6 weight percent styrene, or from 1 to 10 weight percent styrene. In some embodiments, the monomer mixture includes, based on the total weight of monomers in the monomer mixture, from 0 to 25 weight percent methyl methacrylate, or from 1 to 25 weight percent methyl methacrylate, or from 1 to 12 weight percent methyl methacrylate. In some embodiments, the monomer mixture includes, based on the total weight of monomers in the monomer mixture, from 2 to 30 weight percent ethyl acrylate, or from 2 to 25 weight percent ethyl acrylate, or from 2 to 15 weight percent ethyl acrylate. In some embodiments, the ratio of ethyl acrylate to styrene (by weight) is greater than 4.5 to 1, or greater than 5 to 1, or greater than 6 to 1, or greater than 10 to 1, or greater than 50 to 1, or greater than 100 to 1.

In some embodiments, the monomer mixture further comprises another unsaturated monomer in addition to 2-ethylhexyl acrylate, styrene, methyl methacrylate, and ethyl acrylate (which are present in an amounts as described above). In some embodiments, the unsaturated monomer is an olefinically unsaturated monomer. Suitable olefinically unsaturated monomers include esters of monoethylenically unsaturated carboxylic acids having 3 to 24 carbon atoms, in particular esters of acrylic and methacrylic acid, including methyl acrylate ("MA"), butyl acrylate ("BA"), butyl methacrylate, isobutyl acrylate, isobutyl methacrylate, isoamyl acrylate, isoamyl methacrylate, 2-ethylhexyl methacrylate, isooctyl acrylate, isooctyl methacrylate, n-propyl acrylate, isopropyl acrylate, decyl acrylate, decyl methacrylate, dodecyl acrylate, and dodecyl methacrylate. α,β-Monoethylenically unsaturated mono- or dicarboxylic acids of 3 to 6 carbon atoms, such as acrylic acid ("AA"), methacrylic acid, itaconic acid, fumaric acid and maleic acid, and the anhydrides of mono-olefinically unsaturated dicarboxylic acids, such as maleic anhydride and itaconic anhydride, are also suitable. Other useful olefinically unsaturated monomers are amides, such as acrylamide, methacrylamide, tetrahydrofurfurylacrylamide, tetrahydrofurfurylmethacrylamide, diacetoneacrylamide, hydroxyalkyl acrylates and methacrylates, such as 2-hydroxyethyl acrylate, 2-hydroxyethyl methacrylate, 4-hydroxybutyl acrylate and 4-hydroxybutyl methacrylate, and monomers such as 2-ketobutyl acrylate, 2-ketobutyl methacrylate, N-vinylformamide, N-vinylpyrrolidone, 2-methylene-1,3-dioxepan, 2-methylene-1,3-dioxolane, N-methyl-2-methyleneoxazolidine and 2-methylene-1,3-thiolene. Still other useful olefinically unsaturated monomer include ethylene, propylene, isobutylene, butadiene, isoprene, vinyl methyl ether, vinyl isobutyl ether, vinylpyridine, β-aminoethyl vinyl ether, aminopentyl vinyl ether, tert-butylaminoethyl methacrylate, vinylaromatics, such as methylstyrenes, and vinyl acetate ("VA").

In some embodiments, the acrylic copolymer can comprise, in addition to the aforementioned monomers, small amounts of polyethylenically unsaturated monomers, which when the polymer is prepared result in crosslinking. Examples of polyethylenically unsaturated monomers are diesters and triesters of ethylenically unsaturated carboxylic acids, more particularly the bis- and trisacrylates of diols or polyols having 3 or more OH groups, examples being the bisacrylates and the bismethacrylates of ethylene glycol, diethylene glycol, triethylene glycol, neopentyl glycol or polyethylene glycols, vinyl and allyl esters of saturated or unsaturated dicarboxylic acids, and the vinyl and allyl esters of monoethylenically unsaturated monocarboxylic acids. The fraction of such monomers, however, will generally not exceed, based upon the total weight of monomers in the monomer mixture, 1 weight percent, or 0.5 weight percent, or 0.1 weight percent.

In some embodiments, the adhesive compositions may further include, optionally, one or more additives. Examples of the one or more additives include, but are not limited to, a thickener, a defoamer, a wetting agent, a mechanical stabilizer, a pigment, a filler, a freeze-thaw agent, a neutralizing agent, a plasticizer, a tackifier, an adhesion promoter, and combinations thereof.

The adhesive compositions may comprise 0 to 5 percent by weight of a thickener, based on the total weight of the adhesive composition. Suitable thickeners include, but are not limited to, ACRYSOL™, UCAR™ and CELLOSIZE™ which are commercially available from The Dow Chemical Company.

The adhesive compositions may comprise 0 to 2 percent by weight of a neutralizing agent, based on the total weight of the adhesive composition. Neutralizing agents are typically used to control pH to provide stability to the formulated pressure sensitive adhesive composition. Suitable neutralizing agent include, but are not limited to, aqueous ammonia, aqueous amines, and other aqueous inorganic salts.

The adhesive compositions may comprise less than 50 percent by weight of a tackifier, based on the total weight of the adhesive composition. Suitable tackifiers include, but are not limited to, rosin resins including rosin acid and/or rosin ester obtained by esterifying rosin acid with alcohols or an epoxy compound and/or its mixture, non-hydrogenated aliphatic $C_5$ resins, hydrogenated aliphatic $C_5$ resins, aromatic modified $C_5$ resins, terpene resins, hydrogenated $C_9$ resins, and combinations thereof.

The compositions may comprise less than 5 percent by weight of an adhesion promoter, based on the total weight of the adhesive composition.

The disclosed adhesives compositions can be used for any suitable purposes, and are particularly suitable for use in pressure sensitive adhesive formulations, including pressure sensitive adhesive formulations used in food contact articles, such as plastic packaging, labels and tapes.

EXAMPLES OF THE DISCLOSURE

The present disclosure will now be described in further detail by discussing Illustrative Examples ("IE") and Comparative Examples ("CE") (collectively "the Examples"). However, the scope of the present disclosure is not, of course, limited to the IEs.

Measurement of In-Process Monomer

Emulsion samples of approximately 5 grams in weight are taken periodically from the reactor while the monomer mixture is being fed to the reactor. At least four samples are taken at evenly spaced intervals over the course of the monomer feed. Polymerization in the samples is inhibited by the addition of 4-Hydroxy-TEMPO in water (5 wt %, 0.05 g), and the samples are cooled on ice. From each sample, an aliquot (approximately 0.5 g) is taken and diluted with (approximately 4-8 g of tetrahydrofuran, with the dilution selected so that the maximum concentration of any monomer in the diluted sample is less than 1% by weight. A subsample (20 mg) of diluted material is placed in a 20 ml headspace gas chromatography (GC) vial along with a solution of ethylene glycol diethyl ether in water (5000 ppm, 20 mg) to be used as the internal standard for GC. After the vial is capped, the contents are analyzed by headspace GC on a Agilent 7890B Gas Chromatograph System equipped with an Agilent 7697A Headspace Autosampler.

GC System

Single Split/Splitless inlet with dual column ferrule to allow injection onto both columns simultaneously.

Detector: Flame Ionization Detector (FID)

Column A: Agilent DB Wax UI 30 M×0.32 mm i.d.×0.5 um df column, P/N 123-7033UI.

Column B: Restek RTX-200 30 M×0.32 mm ID×1.0 um df column, P/N 15054.

Carrier gas: Ultrahigh purity helium

Make up gas: nitrogen

Fuel gases: hydrogen and air

Headspace Parameters

Temperature:

| Oven | 130° C. |
| Loop | 140° C. |
| Transfer line | 180° C. |

Times:

| | |
|---|---|
| Vial Equilibration | 10 min |
| Injection Duration | 0.3 min |
| GC Cycle | 32.5 min |

Vial and Loop:

| | |
|---|---|
| Vial Size | 20 ml |
| Vial Fill Pressure | 40 psi |
| Pressure Equilibration Time | 0.1 min |
| Initial Loop Pressure | 40 psi |
| Loop Ramp Rate | 20 psi/min |
| Final Loop Pressure | 10 psi |
| Loop Equilibration | 0.1 min |

GC Parameters
Inlet:

| | |
|---|---|
| Temperature | 180° C. |
| Pressure | 12.1 psi |
| Total Flow | 25.6 ml/min |
| Septum Purge Flow | 3 ml/min |

Mode:

| | |
|---|---|
| Mode | split |
| Split Ratio | 7:1 |
| Split Flow | 19.73 ml/min |

Columns:

| | |
|---|---|
| Flow | 2.8 ml/min |
| Average Velocity | 42.6 cm/sec |
| Holdup Time | 1.17 min |

Oven:

| | |
|---|---|
| Initial Temperature | 40° C. |
| Equilibration Time | 5 min |
| Ramp Rate | 20° C./min |
| Final Temperature | 245° C. |
| Final Time | 5 min |

Detector:

| | |
|---|---|
| Temperature | 300° C. |
| Air Flow | 400 ml/min |
| H2 Fuel Flow | 40 ml/min |
| Makeup Flow (N2) | 20 ml/min |

Preparation of Acrylic Copolymer

The acrylic copolymer emulsions used in the various Examples are produced according to the following:

Comparative Example 1 ("CE1")

The process is run according to Example 1 of U.S. Pat. No. 6,225,401 with a monomer mixture feed time of 4 hours. The maximum in-process monomer level is 13.0 wt %, based on the total weight of the reactor contents during feeding, comprising 10.5 wt % EHA, 2.1 wt % VA, 0.3 wt % MMA, and 0.1 wt % styrene.

Comparative Example 2 ("CE2")

Using a flask equipped with a mechanical stirrer, an initial aqueous charge composed of 0.51 grams tetrasodium pyrophosphate, 640 grams of deionized water, 1.80 grams anhydrous sodium sulfate, and 1.36 grams ascorbic acid is warmed to 87° C. Next, 28.4 grams of 19% concentration sodium persulfate in water is poured into the flask. Over a period of 2.0 hours, an emulsion made up of 14.7 grams of 50% strength aqueous sodium hydroxide solution, 39.4 grams of a 30% concentration solution of a sulfuric ester sodium salt of lauryl alcohol ethoxylated by 12 moles of ethylene oxide in water, 21.2 grams of 25.0% concentration sodium vinylsulfonate solution in water, 28.8 grams of a 22% strength solution of sodium dodecylbenzene sulfonate in water, 6.6 grams of itaconic acid, 236 grams of water, 671.2 grams of methyl methacrylate, 27.6 grams of styrene, 1,890 grams of 2-ethylhexyl acrylate, 59.3 grams of ethyl acrylate, and 14.4 grams of acrylic acid is gradually fed into the flask. At the outset, the rate of addition is 5.0 grams per minute for the first 5.0 minutes. It is then raised steadily to 25.0 grams per minute over the span of 35 minutes. After 75 minutes of total feed time, the rate is raised to 35.0 grams per minute. From the outset of the emulsion feed, 94 grams of a sodium peroxodisulfate solution at 11% strength in water is added at a constant rate over 2.3 hours, and the reactor temperature is kept at 85 to 87° C.

After the completion of the emulsion feed and at roughly 70° C., a solution of 2.76 grams sodium bisulphite, 1.8 grams acetone and 44.4 grams water, and, at the same time, 47.6 grams of a 5.5% concentration solution of tert-butyl hydroperoxide is dispensed to the flask over a period of 45 minutes. A copolymer dispersion of pressure-sensitive adhesive is produced with 70% solids by weight. The maximum in-process monomer level is 20.3% by weight, based on the total weight of the reactor contents during feeding, comprising 16.3% EHA, 0.6% EA, 3.3% MMA, 0.1% styrene.

Comparative Example 3 ("CE3")

Using a flask equipped with a mechanical stirrer, an initial aqueous charge composed of 0.51 grams tetrasodium pyrophosphate, 660 grams of deionized water, 1.80 grams anhydrous sodium sulfate, and 1.36 grams ascorbic acid is warmed to 87° C. Next, 28.4 grams of 19% concentration sodium persulfate in water is poured into the flask. Over a period of 2.0 hours, an emulsion made up of 14.7 grams of 50% strength aqueous sodium hydroxide solution, 39.4 grams of a 30% concentration solution of a sulfuric ester sodium salt of lauryl alcohol ethoxylated by 12 moles of ethylene oxide in water, 21.2 grams of 25.0% concentration sodium vinylsulfonate solution in water, 28.8 grams of a 22% strength solution of sodium dodecylbenzene sulfonate in water, 6.6 grams of itaconic acid, 221 grams of water, 23.2 grams of methyl methacrylate, 138.0 grams of styrene, 2,207.6 grams of 2-ethylhexyl acrylate, 279.3 grams of ethyl acrylate, and 14.4 grams of acrylic acid is gradually fed into the flask. At the outset, the rate of addition is 5.0 grams per minute for the first 5.0 minutes. It is then raised steadily to 25.0 grams per minute over the span of 35 minutes. After 75 minutes of total feed time, the rate is raised to 35.0 grams per minute. From the outset of the emulsion feed, 94 grams of a sodium peroxodisulfate solution at 11% strength in water is added at a constant rate over 2.3 hours, and the reactor temperature is kept at 85 to 87° C.

After the completion of the feeds and at roughly 70° C., a solution of 2.76 grams sodium bisulphite, 1.8 grams acetone and 44.4 grams water, and, at the same time, 47.6 grams of a 5.5% concentration solution of tert-butyl hydroperoxide is dispensed to the flask over a period of 45 minutes. A copolymer dispersion of pressure-sensitive adhesive is produced with 70% solids by weight. The maximum in-process monomer level is 19.8% by weight, based on the total weight of the reactor contents during feeding, comprising 17.1% EHA, 2.2% EA, 0.1% MMA, 0.4% styrene.

Illustrative Example 1 ("IE1")

Using a flask equipped with a mechanical stirrer, an initial aqueous charge composed of 0.25 grams tetrasodium pyrophosphate, 330 grams of deionized water, 0.90 grams anhydrous sodium sulfate, and 0.68 grams ascorbic acid is warmed to 87° C. Next, 14.2 grams of 19% concentration sodium persulfate in water is poured into the flask. Over a period of 2.0 hours, an emulsion made up of 7.4 grams of 50% strength aqueous sodium hydroxide solution, 19.7 grams of a 30% concentration solution of a sulfuric ester sodium salt of lauryl alcohol ethoxylated by 12 moles of ethylene oxide in water, 10.6 grams of 25.0% concentration sodium vinylsulfonate solution in water, 14.4 grams of a 22% strength solution of sodium dodecylbenzene sulfonate in water, 3.3 grams of itaconic acid, 135 grams of water, 69.0 grams of styrene, 903.8 grams of 2-ethylhexyl acrylate, 339.7 grams of ethyl acrylate, 11.6 grams of methyl methacrylate, and 7.2 grams of acrylic acid is gradually fed into the flask. At the outset, the rate of addition is 2.5 grams per minute for the first 5.0 minutes. It is then raised steadily to 12.5 grams per minute over the span of 35 minutes. After 75 minutes of total feed time, the rate is raised to 17.5 grams per minute. From the outset of the emulsion feed, 47 grams of a sodium peroxodisulfate solution at 11% strength in water is added at a constant rate over 2.3 hours, and the reactor temperature is kept at 85 to 87° C.

After the completion of the feeds and at roughly 70° C., a solution of 1.38 grams sodium bisulphite, 0.9 grams acetone and 22.2 grams water, and, at the same time, 23.8 grams of a 5.5% concentration solution of tert-butyl hydroperoxide is dispensed to the flask over a period of 45 minutes. A copolymer dispersion of pressure-sensitive adhesive is produced with 69% solids by weight. The maximum in-process monomer level is 16.9% by weight, based on the total weight of the reactor contents during feeding, comprising 11.8% EHA, 4.7% EA, 0.1% MMA, and 0.3% styrene.

Illustrative Example 2 ("IE2")

Using a flask equipped with a mechanical stirrer, an initial aqueous charge composed of 0.51 grams tetrasodium pyrophosphate, 660 grams of deionized water, 1.80 grams anhydrous sodium sulfate, and 1.36 grams ascorbic acid is warmed to 87° C. Next, 28.4 grams of 19% concentration sodium persulfate in water is poured into the flask. Over a period of 2.0 hours, an emulsion made up of 14.7 grams of 50% strength aqueous sodium hydroxide solution, 39.4 grams of a 30% concentration solution of a sulfuric ester sodium salt of lauryl alcohol ethoxylated by 12 moles of ethylene oxide in water, 21.2 grams of 25.0% concentration sodium vinylsulfonate solution in water, 28.8 grams of a 22% strength solution of sodium dodecylbenzene sulfonate in water, 6.6 grams of itaconic acid, 270 grams of water, 110.4 grams of styrene, 1,830.8 grams of 2-ethylhexyl acrylate, 706.9 grams of ethyl acrylate, and 14.4 grams of acrylic acid is gradually fed into the flask. At the outset, the rate of addition is 5.0 grams per minute for the first 5.0 minutes. It is then raised steadily to 25.0 grams per minute over the span of 35 minutes. After 75 minutes of total feed time, the rate is raised to 35.0 grams per minute. From the outset of the emulsion feed, 94 grams of a sodium peroxodisulfate solution at 11% strength in water is added at a constant rate over 2.3 hours, and the reactor temperature is kept at 85 to 87° C.

After the completion of the feeds and at roughly 70° C., a solution of 2.76 grams sodium bisulphite, 1.8 grams acetone and 44.4 grams water, and, at the same time, 47.6 grams of a 5.5% concentration solution of tert-butyl hydroperoxide is dispensed to the flask over a period of 45 minutes. A copolymer dispersion of pressure-sensitive adhesive is produced with 69% solids by weight. The maximum in-process monomer level is 13.2% by weight, based on the total weight of the reactor contents during feeding, comprising 9.4% EHA, 3.7% EA, and 0.1% styrene.

Illustrative Example 3 ("IE3")

Using a flask equipped with a mechanical stirrer, an initial aqueous charge composed of 0.51 grams tetrasodium pyrophosphate, 640 grams of deionized water, 1.80 grams anhydrous sodium sulfate, and 1.36 grams ascorbic acid is warmed to 87° C. Next, 28.4 grams of 19% concentration sodium persulfate in water is poured into the flask. Over a period of 2.0 hours, an emulsion made up of 14.7 grams of 50% strength aqueous sodium hydroxide solution, 39.4 grams of a 30% concentration solution of a sulfuric ester sodium salt of lauryl alcohol ethoxylated by 12 moles of ethylene oxide in water, 21.2 grams of 25.0% concentration sodium vinylsulfonate solution in water, 28.8 grams of a 22% strength solution of sodium dodecylbenzene sulfonate in water, 6.6 grams of itaconic acid, 236 grams of water, 158.4 grams of methyl methacrylate, 2.8 grams of styrene, 2,207.6 grams of 2-ethylhexyl acrylate, 279.3 grams of ethyl acrylate, and 14.4 grams of acrylic acid is gradually fed into the flask. At the outset, the rate of addition is 5.0 grams per minute for the first 5.0 minutes. It is then raised steadily to 25.0 grams per minute over the span of 35 minutes. After 75 minutes of total feed time, the rate is raised to 35.0 grams per minute. From the outset of the emulsion feed, 94 grams of a sodium peroxodisulfate solution at 11% strength in water is added at a constant rate over 2.3 hours, and the reactor temperature is kept at 85 to 87° C.

After the completion of the feeds and at roughly 70° C., a solution of 2.76 grams sodium bisulphite, 1.8 grams acetone and 44.4 grams water, and, at the same time, 47.6 grams of a 5.5% concentration solution of tert-butyl hydroperoxide is dispensed to the flask over a period of 45 minutes. A copolymer dispersion of pressure-sensitive adhesive is produced with 70% solids by weight. The maximum in-process monomer level is 9.4% by weight, based on the total weight of the reactor contents during feeding, comprising 8.1% EHA, 1.1% EA, 0.2% MMA, 0.003% styrene.

Illustrative Example 4 ("IE4")

Using a flask equipped with a mechanical stirrer, an initial aqueous charge composed of 0.51 grams tetrasodium pyrophosphate, 640 grams of deionized water, 1.80 grams anhydrous sodium sulfate, and 1.36 grams ascorbic acid is warmed to 87° C. Next, 28.4 grams of 19% concentration sodium persulfate in water is poured into the flask. Over a period of 2.0 hours, an emulsion made up of 14.7 grams of 50% strength aqueous sodium hydroxide solution, 39.4 grams of a 30% concentration solution of a sulfuric ester sodium salt of lauryl alcohol ethoxylated by 12 moles of ethylene oxide in water, 21.2 grams of 25.0% concentration sodium vinylsulfonate solution in water, 28.8 grams of a 22% strength solution of sodium dodecylbenzene sulfonate in water, 6.6 grams of itaconic acid, 236 grams of water, 321.2 grams of methyl methacrylate, 55.2 grams of styrene, 1,592.4 grams of 2-ethylhexyl acrylate, 679.3 grams of ethyl acrylate, and 14.4 grams of acrylic acid is gradually fed into the flask. At the outset, the rate of addition is 5.0 grams per minute for the first 5.0 minutes. It is then raised steadily to 25.0 grams per minute over the span of 35 minutes. After 75 minutes of total feed time, the rate is raised to 35.0 grams per minute. From the outset of the emulsion feed, 94 grams of a sodium peroxodisulfate solution at 11% strength in water is added at a constant rate over 2.3 hours, and the reactor temperature is kept at 85 to 87° C.

After the completion of the feeds and at roughly 70° C., a solution of 2.76 grams sodium bisulphite, 1.8 grams acetone and 44.4 grams water, and, at the same time, 47.6 grams of a 5.5% concentration solution of tert-butyl hydroperoxide is dispensed to the flask over a period of 45 minutes. A copolymer dispersion of pressure-sensitive adhesive is produced with 70% solids by weight. The maximum in-process monomer level is 13.8% by weight, based on the total weight of the reactor contents during feeding, comprising 8.7% EHA, 4.2% EA, 0.8% MMA, 0.1% styrene.

Illustrative Example 5 ("IE5")

Using a flask equipped with a mechanical stirrer, an initial aqueous charge composed of 0.51 grams tetrasodium pyrophosphate, 640 grams of deionized water, 1.80 grams anhydrous sodium sulfate, and 1.36 grams ascorbic acid is warmed to 87° C. Next, 28.4 grams of 19% concentration sodium persulfate in water is poured into the flask. Over a period of 2.0 hours, an emulsion made up of 14.7 grams of 50% strength aqueous sodium hydroxide solution, 39.4 grams of a 30% concentration solution of a sulfuric ester sodium salt of lauryl alcohol ethoxylated by 12 moles of ethylene oxide in water, 21.2 grams of 25.0% concentration sodium vinylsulfonate solution in water, 28.8 grams of a 22% strength solution of sodium dodecylbenzene sulfonate in water, 6.6 grams of itaconic acid, 236 grams of water, 621.2 grams of methyl methacrylate, 27.6 grams of styrene, 1,862.4 grams of 2-ethylhexyl acrylate, 136.9 grams of ethyl acrylate, and 14.4 grams of acrylic acid is gradually fed into the flask. At the outset, the rate of addition is 5.0 grams per minute for the first 5.0 minutes. It is then raised steadily to 25.0 grams per minute over the span of 35 minutes. After 75 minutes of total feed time, the rate is raised to 35.0 grams per minute. From the outset of the emulsion feed, 94 grams of a sodium peroxodisulfate solution at 11% strength in water is added at a constant rate over 2.3 hours, and the reactor temperature is kept at 85 to 87° C.

After the completion of the feeds and at roughly 70° C., a solution of 2.76 grams sodium bisulphite, 1.8 grams acetone and 44.4 grams water, and, at the same time, 47.6 grams of a 5.5% concentration solution of tert-butyl hydroperoxide is dispensed to the flask over a period of 45 minutes. A copolymer dispersion of pressure-sensitive adhesive is produced. The maximum in-process monomer level is 14.1% by weight, based on the total weight of the reactor contents during feeding, comprising 11.2% EHA, 1.0% EA, 1.9% MMA, 0.05% styrene.

Illustrative Example 6 ("IE6")

Using a flask equipped with a mechanical stirrer, an initial aqueous charge composed of 1.34 grams tetrasodium pyrophosphate, 330 grams of deionized water, and 0.68 grams ascorbic acid is warmed to 87° C. Next, 15.7 grams of 17% concentration sodium persulfate in water is poured into the flask. Over a period of 2.75 hours, an emulsion made up of 7.4 grams of 50% strength aqueous sodium hydroxide solution, 19.7 grams of a 30% concentration solution of a sulfuric ester sodium salt of lauryl alcohol ethoxylated by 12 moles of ethylene oxide in water, 10.6 grams of 25.0% concentration sodium vinylsulfonate solution in water, 14.4 grams of a 22% strength solution of sodium dodecylbenzene sulfonate in water, 3.3 grams of itaconic acid, 135 grams of water, 27.6 grams of styrene, 1,051.6 grams of 2-ethylhexyl acrylate, 134.4 grams of ethyl acrylate, 110.4 grams of vinyl acetate, and 7.2 grams of acrylic acid is gradually fed into the flask. At the outset, the rate of addition is 1.9 grams per minute for the first 6.0 minutes. It is then raised steadily to 9.3 grams per minute over the span of 40 minutes. After 125 minutes of total feed time, the rate is raised to 13.1 grams per minute. From the outset of the emulsion feed, 57 grams of a sodium peroxodisulfate solution at 12% strength in water is added at a constant rate over 3.25 hours, and the reactor temperature is kept at 85 to 87° C.

After the completion of the feeds and at roughly 70° C., a solution of 5.52 grams sodium bisulphite and 20.0 grams water, and, at the same time, 20.0 grams of a 26% concentration solution of tert-butyl hydroperoxide is dispensed to the flask over a period of 60 minutes. A copolymer dispersion of pressure-sensitive adhesive is produced with 69% solids by weight. The maximum in-process monomer level is 8.7% by weight, based on the total weight of the reactor contents during feeding, comprising 6.7% EHA, 0.8% EA, 1.1% VA, and 0.1% styrene.

TABLE 1

Monomer Mixture Feed Compositions

| Example | Monomer feed composition (wt % of total monomer) | | | | | EA/Sty ratio | Monomer feed time (h) | Max in-process monomer (wt %) |
|---|---|---|---|---|---|---|---|---|
| | EHA (%) | EA (%) | Sty (%) | MMA (%) | VA (%) | | | |
| CE1** | 80.9 | | 2.1 | 8.0 | 8.3 | 0 | 4 | 13.0 |
| CE2* | 70.6 | 2.2 | 1.0 | 25.2 | | 2.2 | 2 | 20.3 |
| CE3* | 82.5 | 10.4 | 5.2 | 0.9 | | 2.0 | 2 | 19.8 |
| IE1* | 67.6 | 24.5 | 5.2 | 0.9 | | 4.7 | 2 | 16.9 |
| IE2* | 68.5 | 26.4 | 4.1 | | | 6.4 | 2 | 13.2 |
| IE3* | 82.5 | 10.5 | 0.1 | 5.9 | | 105.0 | 2 | 9.4 |
| IE4* | 59.5 | 25.4 | 2.1 | 12.0 | | 12.1 | 2 | 13.8 |
| IE5* | 69.6 | 5.1 | 1.0 | 23.3 | | 5.1 | 2 | 14.1 |
| IE6* | 78.6 | 10.1 | 2.1 | | 8.3 | 4.9 | 2.75 | 8.7 |

*Balance of monomer composition is 0.5% AA/0.2% SVS/0.3% itaconic acid.
**Balance of monomer composition is 0.5% AA/0.2% SVS In the Illustrative Examples, the in-process monomer level is below 17% while monomer feed time is less than or equal to 3 hours. On the contrary, some Comparative Examples have monomer feed times greater than 3 hours (e.g., C1). It is known in the art that the in-process monomer level can be decreased by extending the feed time. It is unexpected that adding a small proportion of EA allows the in-process monomer level to be decreased while keeping the feed time short. The comparative examples with feed times of less than 3 hours (e.g., C2, C3) have in-process monomer levels greater than 17%.

In addition to the embodiments described above and those set forth in the Examples, many embodiment of specific combinations are within the scope of the disclosure, some of which are described below:

Embodiment 1. An adhesive composition, comprising:
an acrylic copolymer formed from a monomer mixture comprising, based on the total weight of monomers in the monomer mixture,
from 59 to 97.9 weight percent 2-ethylhexyl acrylate;
from 0.1 to 10 weight percent styrene;
from 0 to 25 weight percent methyl methacrylate; and
from 2 to 30 weight percent ethyl acrylate,
wherein the ratio of ethyl acrylate to styrene (by weight) is greater than 4.5 to 1.

Embodiment 2. The adhesive composition of any preceding or succeeding Embodiment, wherein the monomer mixture comprises, based on the total weight of monomers in the monomer mixture, from 60 to 85 weight percent 2-ethylhexyl acrylate.

Embodiment 3. The adhesive composition of any preceding or succeeding Embodiment, wherein the monomer mixture comprises, based on the total weight of monomers in the monomer mixture, from 65 to 80 weight percent 2-ethylhexyl acrylate.

Embodiment 4. The adhesive composition of any preceding or succeeding Embodiment, wherein the monomer mixture comprises, based on the total weight of monomers in the monomer mixture, from 0.1 to 6 weight percent styrene.

Embodiment 5. The adhesive composition of any preceding or succeeding Embodiment, wherein the monomer mixture comprises, based on the total weight of monomers in the monomer mixture, from 1 to 6 weight percent styrene.

Embodiment 6. The adhesive composition of any preceding or succeeding Embodiment, wherein the monomer mixture comprises, based on the total weight of monomers in the monomer mixture, from 1 to 25 weight percent methyl methacrylate.

Embodiment 7. The adhesive composition of any preceding or succeeding Embodiment, wherein the monomer mixture comprises, based on the total weight of monomers in the monomer mixture, from 1 to 12 weight percent methyl methacrylate.

Embodiment 8. The adhesive composition of any preceding or succeeding Embodiment, wherein the monomer mixture comprises, based on the total weight of monomers in the monomer mixture, from 2 to 25 weight percent ethyl acrylate.

Embodiment 9. The adhesive composition of any preceding or succeeding Embodiment, wherein the monomer mixture comprises, based on the total weight of monomers in the monomer mixture, from 2 to 15 weight percent ethyl acrylate.

Embodiment 10. The adhesive composition of any preceding or succeeding Embodiment, wherein the monomer mixture further comprises an unsaturated monomer.

Embodiment 11. The adhesive composition of any preceding or succeeding Embodiment, wherein the unsaturated monomer is selected from the group consisting of methyl acrylate, butyl acrylate, butyl methacrylate, isobutyl acrylate, isobutyl methacrylate, isoamyl acrylate, isoamyl methacrylate, 2-ethylhexyl methacrylate, isooctyl acrylate, isooctyl methacrylate, n-propyl acrylate, isopropyl acrylate, decyl acrylate, decyl methacrylate, dodecyl acrylate, dodecyl methacrylate, acrylic acid, methacrylic acid, itaconic acid, fumaric acid, maleic acid, maleic anhydride, itaconic anhydride, acrylamide, methacrylamide, tetrahydrofurfurylacrylamide, tetrahydrofurfurylmethacrylamide, diacetoneacrylamide, 2-hydroxyethyl acrylate, 2-hydroxyethyl methacrylate, 4-hydroxybutyl acrylate, 4-hydroxybutyl methacrylate, 2-ketobutyl acrylate, 2-ketobutyl methacrylate, N-vinylformamide, N-vinylpyrrolidone, 2-methylene-1,3-dioxepan, 2-methylene-1,3-dioxolane, N-methyl-2-methyleneoxazolidine, 2-methylene-1,3-thiolene, ethylene, propylene, isobutylene, butadiene, isoprene, vinyl methyl ether, vinyl isobutyl ether, vinylpyridine, β-aminoethyl vinyl ether, aminopentyl vinyl ether, tert-butylaminoethyl methacrylate, methylstyrene, vinyl acetate, sodium vinyl sulfonate, and combinations thereof.

Embodiment 12. A method for preparing an adhesive composition by emulsion polymerization, comprising:
feeding an aqueous initial charge to a reactor;
heating the aqueous initial charge to from about 30 to 110° C.;
gradually feeding a monomer mixture into the reactor over a period of time, in the presence of a free-radical polymerization initiator, thereby forming the adhesive composition, the monomer mixture comprising, based on the total weight of monomers in the monomer mixture, from 59 to 97.9 weight percent 2-ethylhexyl acrylate, from 0.1 to 10 weight percent styrene, from 0 to 25 weight percent methyl methacrylate, and from 2 to 30 weight percent ethyl acrylate,
wherein the amount of free monomer in the reactor does not exceed 17 percent by weight, based on the total weight of the reactor contents, during gradual feeding.

Embodiment 13. The method for preparing an adhesive composition by a monomer emulsion feed polymerization according to any preceding or succeeding Embodiment, wherein the ratio of ethyl acrylate to styrene (by weight) is greater than 4.5 to 1.

Embodiment 14. The method for preparing an adhesive composition by a monomer emulsion feed polymerization, wherein the period of time for gradual feeding does not exceed 3 hours in length.

Embodiment 15. A food contact article including an adhesive layer comprising an adhesive composition, the adhesive composition comprising an acrylic emulsion formed from a monomer mixture comprising, based on the total weight of monomers in the monomer mixture,
from 59 to 97.9 weight percent 2-ethylhexyl acrylate;
from 0.1 to 10 weight percent styrene;
from 0 to 25 weight percent methyl methacrylate; and
from 2 to 30 weight percent ethyl acrylate,
wherein the ratio of ethyl acrylate to styrene (by weight) is greater than 4.5 to 1.

Embodiment 16. The food contact article of any preceding or succeeding Embodiment, wherein the food contact article is a plastic packaging, label or tape.

The invention claimed is:

1. An adhesive composition, comprising:
an acrylic copolymer formed from a monomer mixture comprising, based on the total weight of monomers in the monomer mixture,
from 59 to 97.9 weight percent 2-ethylhexyl acrylate;
from 0.1 to 10 weight percent styrene;
from 0 to 25 weight percent methyl methacrylate;
from 2 to 30 weight percent ethyl acrylate, and
from 0.1 weight percent to less than 1 weight percent of an additional polyethylenically unsaturated monomer different from the above, which when the polymer is prepared results in crosslinking;

wherein the ratio of ethyl acrylate to styrene (by weight) is greater than 4.5 to 1.

2. The adhesive composition of claim 1, wherein the polyethylenically unsaturated monomer is selected from the group consisting of methyl acrylate, butyl acrylate, butyl methacrylate, isobutyl acrylate, isobutyl methacrylate, isoamyl acrylate, isoamyl methacrylate, 2-ethylhexyl methacrylate, isooctyl acrylate, isooctyl methacrylate, n-propyl acrylate, isopropyl acrylate, decyl acrylate, decyl methacrylate, dodecyl acrylate, dodecyl methacrylate, acrylic acid, methacrylic acid, itaconic acid, fumaric acid, maleic acid, maleic anhydride, itaconic anhydride, acrylamide, methacrylamide, tetrahydrofurfurylacrylamide, tetrahydrofurfurylmethacrylamide, diacetoneacrylamide, 2-hydroxyethyl acrylate, 2-hydroxyethyl methacrylate, 4-hydroxybutyl acrylate, 4-hydroxybutyl methacrylate, 2-ketobutyl acrylate, 2-ketobutyl methacrylate, N-vinylformamide, N-vinylpyrrolidone, 2-methylene-1,3-dioxepan, 2-methylene-1,3-dioxolane, N-methyl-2-methyleneoxazolidine, 2-methylene-1,3-thiolene, ethylene, propylene, isobutylene, butadiene, isoprene, vinyl methyl ether, vinyl isobutyl ether, vinylpyridine, β-aminoethyl vinyl ether, aminopentyl vinyl ether, tert-butylaminoethyl methacrylate, methylstyrene, vinyl acetate, sodium vinyl sulfonate, and combinations thereof.

3. A method for preparing an adhesive composition by emulsion polymerization, comprising:
feeding an aqueous initial charge to a reactor;
heating the aqueous initial charge to from about 30 to 110° C.;
gradually feeding a monomer mixture into the reactor over a period of time, in the presence of a free-radical polymerization initiator, thereby forming the adhesive composition, the monomer mixture comprising, based on the total weight of monomers in the monomer mixture, from 59 to 97.9 weight percent 2-ethylhexyl acrylate, from 0.1 to 10 weight percent styrene, from 0 to 25 weight percent methyl methacrylate, from 2 to 30 weight percent ethyl acrylate, and from 0.1 weight percent to less than 1 weight percent of an additional polyethylenically unsaturated monomer different from the above, which when the polymer is prepared results in crosslinking,
wherein the amount of free monomer in the reactor does not exceed 17 percent by weight, based on the total weight of the reactor contents, during gradual feeding.

4. The method for preparing an adhesive composition by a monomer emulsion feed polymerization of claim 3, wherein the ratio of ethyl acrylate to styrene (by weight) is greater than 4.5 to 1.

5. The method for preparing an adhesive composition by a monomer emulsion feed polymerization of claim 3, wherein the period of time for gradual feeding does not exceed 3 hours in length.

6. A food contact article including an adhesive layer comprising an adhesive composition, the adhesive composition comprising an acrylic emulsion formed from a monomer mixture comprising, based on the total weight of monomers in the monomer mixture,
from 59 to 97.9 weight percent 2-ethylhexyl acrylate;
from 0.1 to 10 weight percent styrene;
from 0 to 25 weight percent methyl methacrylate; and
from 2 to 30 weight percent ethyl acrylate,
wherein the ratio of ethyl acrylate to styrene (by weight) is greater than 4.5 to 1.

7. The food contact article of claim 6, wherein the food contact article is a plastic packaging, label or tape.

* * * * *